United States Patent
Lin et al.

(10) Patent No.: US 7,668,895 B2
(45) Date of Patent: Feb. 23, 2010

(54) GALOIS FIELD COMPUTATION

(75) Inventors: Huashih Lin, San Gabriel, CA (US); Lloyd Welch, La Canada Flintridge (CA); Hsiao-Feng Lu, Chia-Yi (TW)

(73) Assignee: Integrated System Solution Corp., Hsinchu (TW)

( * ) Notice: Subject to any disclaimer, the term of this patent is extended or adjusted under 35 U.S.C. 154(b) by 643 days.

(21) Appl. No.: 11/000,013

(22) Filed: Dec. 1, 2004

(65) Prior Publication Data

US 2006/0117079 A1 Jun. 1, 2006

(51) Int. Cl.
*G06F 7/72* (2006.01)
(52) U.S. Cl. ...................................... 708/492
(58) Field of Classification Search .................. 708/492
See application file for complete search history.

(56) References Cited

U.S. PATENT DOCUMENTS

| | | | | |
|---|---|---|---|---|
| 4,989,171 | A * | 1/1991 | Hollmann | 708/492 |
| 6,820,105 | B2 * | 11/2004 | Blaker | 708/491 |
| 7,197,527 | B2 * | 3/2007 | Naslund et al. | 708/492 |
| 2004/0078407 | A1 * | 4/2004 | Naslund et al. | 708/492 |
| 2006/0117079 | A1 * | 6/2006 | Lin et al. | 708/492 |

* cited by examiner

*Primary Examiner*—David H Malzahn
(74) *Attorney, Agent, or Firm*—Alston & Bird LLP

(57) ABSTRACT

A method and device for computing the multiplicative inverse of element x in Galois field $GF(p^{2m})$ is proposed. In particular, when p is a prime number and m is an integer, the inverse may be constructed based on the observation that $x^{p^m+1}$ is en element in sub-field $GF(p^m)$ and the inverse of $x^{p^m+1}$ can be carried out in the sub-field. The inverse of X may be obtained by multiplying $x^{-1}=(x^{p^m+1})^{-1}$ by $x^{p^m}$.

6 Claims, 1 Drawing Sheet

GALOIS FIELD COMPUTATION

FIELD

The present invention relates to Galois field computations, and to methods and devices for the computation of the inversions of Galois field elements.

BACKGROUND

A Galois field GF(n) is a set of elements that allows binary operations, such as addition and multiplication operations. Computations of Galois field elements are frequently seen in communication systems and encryption standards, such as encryption standards for wireless applications. For example, Wireless Local Area Networks (WLAN) may rely on the use of encryptions to ensure security of data transmitted wirelessly. One of the WLAN standard, IEEE 802.11i, incorporates Advanced Encryption Standard (AES) by the National Institute of Standards and Technology (NIST), and the AES is based on Rijndael Block Cipher. In implementing the AES, Galois field is used for various computations, which may consume a majority of hardware resources. In particular, computations of inversions in Galois field, such as $GF(2^8)$, is one of the primary factors in consuming hardware resources.

Conventional implementation uses a look-up table to store the multiplicative inverses for all 255 nonzero elements in $GF(2^8)$. This approach is straightforward and has little latency, but requires a lot of logic gates, hence, a larger area in ASIC and higher power consumption. A well-known approach is to use the Extended Euclidean Algorithm (EEA). For example, assuming the field $GF(2^8)$ is constituted by some irreducible polynomial f(x) of degree eight. By the irreducibility of f(x), every nonzero element in $GF(2^8)$, when represented in its polynomial form, such as p(x) is co-prime to f(x). That is, the greatest common divisor between f(x) and p(x) is one.

The EEA can then be used to find two polynomials q(x) and r(x) so that p(x) q(x)+f(x) r(x)=1. Conducing modulo-reduction on both sides by f(x), one may obtain p(x) q(x)=1 mod (f(x)), and hence, q(x) is exactly the multiplicative inverse of p(x) in $GF(2^8)$. Generally, to find multiplicative inverse in $GF(2^m)$, the EEA requires 2m time steps and has an area complexity of O(m). This method requires less hardware, but may suffer from larger latency, which will not be suitable for a high-throughput system, such as a WLAN system.

An alternate approach includes performing the required computations in the sub-field to reduce hardware complexity. Observing that the field $GF(2^4)$ is a sub-field of $GF(2^8)$, $GF(2^8)$ can be constructed by using some primitive polynomial $g(x)=x^2+x+\lambda$ for some $\lambda$ in $GF(2^4)$. In this approach, all computations are done in the sub-field $GF(2^4)$. To compute inv(x), the above algorithm requires 4 multiplications and one multiplicative inversion in GF(16). Due to the complexity of the traditional techniques, there is a need for a technique for computing Galois field inversions that may bring simplicity in computation of hardware and software implementations.

SUMMARY

An aspect of the invention includes a data encryption method. The encryption method comprises the computation of the inverse of an element x in Galois field $GF(p^{2m})$, wherein p is a prime number and m is an integer. In one embodiment, the computation of the inverse comprises: computing $x^{p^m+1}$; computing an inverse for $x^{p^m+1}$ in $GF(p^m)$, $(x^{p^m+1})^{-1}$; computing $x^{p^m}$; and multiplying $(x^{p^m+1})^{-1}$ by $x^{p^m}$, to obtain the inverse of the element x, $x^{-1}$.

Another aspect of the invention includes a data encryption device that is configured to compute at least an inverse of an element x in Galois field $GF(p^{2m})$, wherein p is a prime number and m is an integer. The device comprises: a first group of logic gates being configured to compute $x^{p^m+1}$; a second group of logic gates being configured to compute an inverse for $x^{p^m+1}$ in $GF(p^m)$, $(x^{p^m+1})^{-1}$; a third group of logic gates being configured to compute $x^{p^m}$; and a fourth group of logic gates being configured to multiply $(x^{p^m+1})^{-1}$ by $x^{p^m}$, to obtain the inverse of the element x, $x^{-1}$.

Another aspect of the invention includes a method of computing an inverse of an element x in Galois field $GF(p^{2m})$, wherein p is a prime number and m is an integer. In one embodiment, the method comprises: computing $x^{p^m+1}$; computing an inverse for $x^{p^m+1}$ in $GF(p^m)$, $(x^{p^m+1})^{-1}$; computing $x^{p^m}$; and multiplying $(x^{p^m+1})^{-1}$ by $x^{p^m}$, to obtain the inverse of the element x, $x^{-1}$.

DETAILED DESCRIPTION OF THE INVENTION

Figure 1:
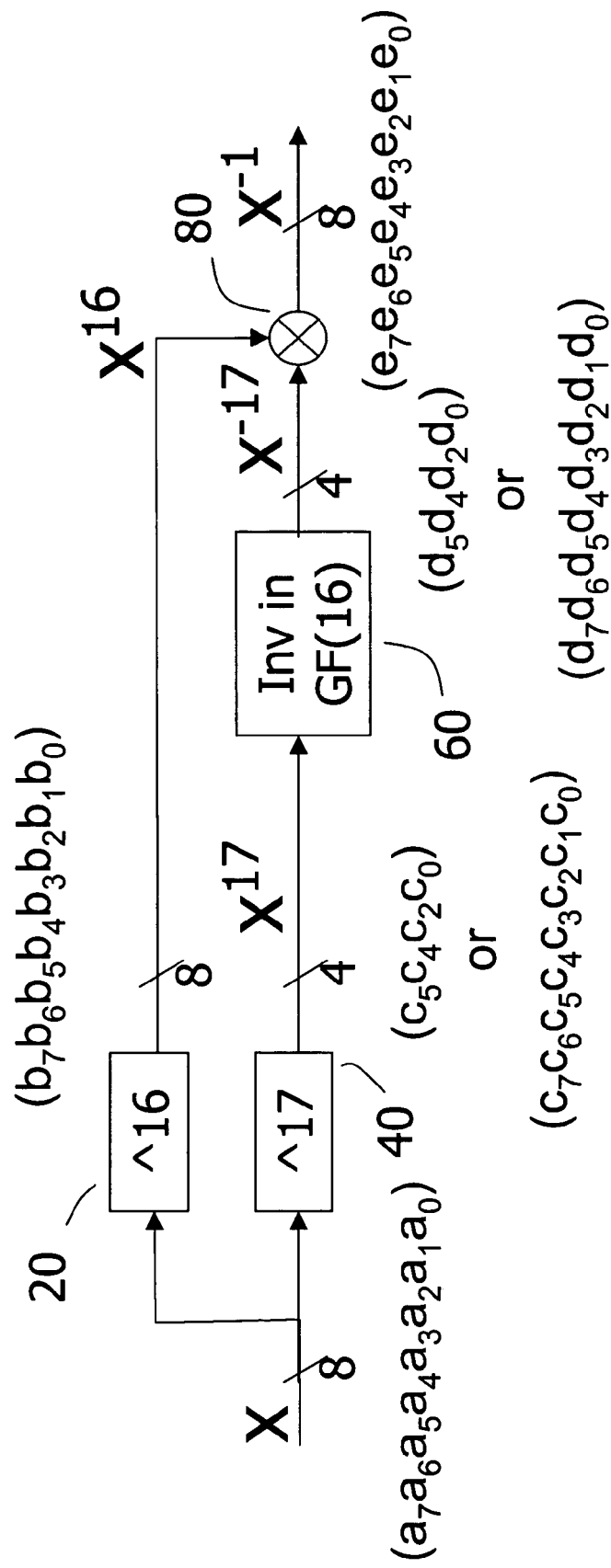
FIG. 1 is a schematic block diagram illustrating a device for computing the inversion in GF(256) in embodiments consistent with the present invention.

The present invention relates to Galois field computations, including the computation of the inversions of Galois field elements, such as those computations applicable to wireless local area network security applications. Embodiments consistent with the invention may provide techniques for computing the inversion of an element in Galois field that may bring simplicity, efficiency, or both, in hardware or software implementations. Furthermore, embodiments consistent with the invention may allow circuit size reduction, including substantial chip area reduction in hardware implementations, thereby allowing and benefiting applications such as WLAN security applications.

To illustrate the computation in embodiments consistent with the invention, we may use the computation in GF(256) as an example. To find the multiplicative inverse in GF(256), we first look at the properties of GF(256) for any nonzero element x in GF(256), $x^{(256-1)}=1$. And for any element x in GF(256), $x^{17}$ is in GF(16), a sub-field of GF(256), since for all nonzero elements, $(x^{17})^{(16-1)}=1$. Therefore, we may derive the following equation:

$$\text{Inverse}_{GF(256)}(x)=x^{16}x^{-17}=x^{16}\cdot\text{Inverse}_{GF16}(x^{17}).$$

The inversion of GF(256) can be greatly simplified by using the above observation, which may be broken down into several steps of:

compute $x^{17}$;
compute $(x^{17})^{-1}$;
compute $x^{16}$; and
multiplication of $x^{16}$ and $(x^{17})^{-1}$.

Each of these steps can also be systematically constructed using AND and XOR gates. FIG. 1 is a schematic block diagram for the inversion of GF(256) according to an embodiment of the present invention. In FIG. 1, X is an element in GF(256) represented by 8-tuple (a7, a6, a5, a4, a3, a2, a1, a0). Block 20 takes X as input and produces as an output $X^{16}$, in an 8-tuple form as (b7, b6, b5, b4, b3, b2, b1, b0). For example, block 20 raises X to 16-th power, which only involves linear operation, so only XOR gates are needed. In one example, one can generate an alternative design using CAD tools by providing the input-output relation in equation or truth-table formats. Examples of details are explained in below. For example:

$b_0 = a_0 + a_4 + a_5 + a_6$ $b_1 = a_1$ $b_2 = a_1 + a_2 + a_4 + a_6 + a_7$ $b_3 = a_1 + a_3 + a_4 + a_6 + a_7$ $b_4 = a_1 + a_5 + a_6$ $b_5 = a_2 + a_3 + a_7$ $b_6 = a_1 + a_2 + a_3 + a_4 + a_7$ $b_7 = a_2 + a_3 + a_5$

Block 40 takes X and produced $X^{17}$, in another 8-tuple (c7, c6, c5, c4, c3, c2, c1, c0). Inverter 60 inverts $X^{17}$ to $X^{-17}$ in 8-tuple (d7, d6, d5, d4, d3, d2, d1, d0). Multiplier 80 multiplies $X^{16}$ by $X^{-17}$ to obtain $X^-$, as (e7, e6, e5, e4, e3, e2, e1, e0). The following paragraphs will illustrate the operations with further detail.

We may use an irreducible polynomial $x^8 + x^4 + x^3 + x^1 + 1$ for the construction of GF(256). All elements of GF(256) can then be represented as 8-tuple $(a_7 a_6 a_5 a_4 a_3 a_2 a_1 a_0)$, which may be equivalently represented by the residual polynomial $_7x^7 + a_6 x^6 + a_5 x^5 + a_4 x^4 + a_3 x^3 + a_2 x^2 + a_1 x + a_0$, where $a_i = 0$ or 1. In addition GF(256) is computed by adding polynomials, with each coefficient modulo 2, which is equivalent to bit-wise XOR's using an 8-tuple representation. Multiplication in GF(256) is computed by multiplying the polynomials with each coefficient modulo 2, and the resulting polynomial modulo is the irreducible polynomial $x^8 + x^4 + x^3 + x^1 + 1$.

It can be shown that element $\alpha = x+1$ (denote the coefficient is in descending order as binary number b'00000011) is a primitive element in GF(256). For all discussions below, we will use $\alpha^{17} = (b'00000011)^{17} = b'11100001$ as a primitive element in GF(16).

And the 16 elements of GF(16) are:
00000000
11100001 $(=\alpha^{17})$
01011100 $(=(\alpha^{17})^2)$
00001100 $(=(\alpha^{17})^3)$
11100000 $(=(\alpha^{17})^4)$
10111101 $(=(\alpha^{17})^5)$
01010000 $(=(\alpha^{17})^6)$
11101100 $(=(\alpha^{17})^7)$
01011101 $(=(\alpha^{17})^8)$
11101101 $(=(\alpha^{17})^9)$
10111100 $(=(\alpha^{17})^{10})$
10110001 $(=(\alpha^{17})^{11})$
10110000 $(=(\alpha^{17})^{12})$
01010001 $(=(\alpha^{17})^{13})$
00001101 $(=(\alpha^{17})^{14})$
00000001 $(=(\alpha^{17})^{15})$ Note these are in the representation of GF(256).

And we can find the four basis elements for GF(16) as follows:
00000001
00001100
01010000
11100000

Or, equivalently, one can represent the four basis elements in polynomial form as follows:

1
$x^3 + x^2$
$x^6 + x^4$
$x^7 + x^6 + x^5$

All 16 elements in GF(16) can be represented by linear combination of the above basis. And the linear combination can be respectively extracted by bits 1, 3, 5, 6, with the right-most bit as the first bit. For example:

10110001 = 1·(00000001) + 0·(00001100) + 1·(01010000) + 1·(11100000)

In the above example, the first basis element is multiplied by 1 (since the 1st bit for 01010001 is 1), the second basis element is multiplied by 0 (since the 3rd bit for 01010001 is 0), the third basis element is multiplied by 1 (since the 5th bit for 01010001 is 1), and the fourth basis element is multiplied by 1 (since the 6th bit for 01010001 is 1).

$$\text{Since } \left(\sum_{i=0}^{7} a_i x^i\right)^2 = \sum_{i=0}^{7} a_i x^{2i} \mod(x^8 + x^4 + x^3 + x^1 + 1),$$

raising to the 2's power in $GF(2^8)$ is always a linear operation, computing $x^{16}$ can be implemented with only XOR gates. Specifically, if $x = (a_7 a_6 a_5 a_4 a_3 a_2 a_1 a_0)$, and $x^{16} = (b_7 b_6 b_5 b_4 b_3 b_2 b_1 b_0)$, one may derive the following relationships:

$b_0 = a_0 + a_4 + a_5 + a_6$ $b_1 = a_1$ $b_2 = a_1 + a_2 + a_4 + a_6 + a_7$ $b_3 = a_1 + a_3 + a_4 + a_6 + a_7$ $b_4 = a_1 + a_5 + a_6$ $b_5 = a_2 + a_3 + a_7$ $b_6 = a_1 + a_2 + a_3 + a_4 + a_7$ $b_7 = a_2 + a_3 + a_5$

Since $x^{17} = x^{16} x$, computing $x^{17}$ is a quadratic function. If $$x^{17} = (c_7 c_6 c_5 c_4 c_3 c_2 c_1 c_0) \left(\sum_{i=0}^{7} c_i x^i\right) =$$

$$\left(\sum_{i=0}^{7} a_i x^i\right)\left(\sum_{i=0}^{7} b_i x^i\right) \mod(x^8 + x^4 + x^3 + x^1 + 1),$$

then, $c_i$ will be in the form of:

$c_i = \Sigma a_j b_l$, for $i = 0, 1, 2, \ldots, 7$.

As a result, $b_i$'s are linear functions in $a_j$'s, and $f(x) = x^{17}$ can be implemented using two-input AND gates to generate some intermediate functions, and XOR gates to generate the final ($x^{17}$) function. Furthermore, because $x^{17}$ is in GF(16), only $c_0, c_2, c_4, c_5$ need to be calculated. Since $a_i$ is either 0 or 1, $a_i^2 = a_i$. A two-input AND function with the two identical inputs becomes an "identity" function with one input. In addition to the eight "identity" functions, one can easily find that there are only a total of 28 non-trivial "two-input" AND functions as follows:

$f_1 = a_1 a_0$ $f_2 = a_2 a_0$ $f_3 = a_2 a_1$
$f_4 = a_3 a_0$
$f_5 = a_3 a_1$
$f_6 = a_3 a_2$
$f_7 = a_4 a_0$
$f_8 = a_4 a_1$
$f_9 = a_4 a_2$
$f_{10} = a_4 a_3$
$f_{11} = a_5 a_0$
$f_{12} = a_5 a_1$
$f_{13} = a_5 a_2$
$f_{14} = a_5 a_3$
$f_{15} = a_5 a_4$
$f_{16} = a_6 a_0$
$f_{17} = a_6 a_1$
$f_{18} = a_6 a_2$
$f_{19} = a_6 a_3$
$f_{20} = a_6 a_4$
$f_{21} = a_6 a_5$
$f_{22} = a_7 a_0$
$f_{23} = a_7 a_1$
$f_{24} = a_7 a_2$
$f_{25} = a_7 a_3$
$f_{26} = a_7 a_4$
$f_{27} = a_7 a_5$
$f_{28} = a_7 a_6$

And one can derive the following expressions for c0, c2, c4 and c5.

$c_0 = a_0 + a_2 + a_3 + a_5 + a_6 + f_5 + f_7 + f_8 + f_9 + f_{11} + f_{13} + f_{16} + f_{18} + f_{20} + f_{24} + f_{25} + f_{26} + f_{27}$ $c_2 = a_1 + a_2 + a_4 + a_5 + a_7 + f_1 + f_5 + f_6 + f_7 + f_8 + f_9 + f_{10} + f_{12} + f_{13} + f_{16} + f_{20} + f_{21} + f_{22} + f_{23} + f_{25} + f_{26} + f_{27} + f_{28}$ $c_4 = a_1 + a_2 + a_4 + a_5 + a_7 + f_1 + f_3 + f_7 + f_{10} + f_{11} + f_{15} + f_{16} + f_{17} + f_{18} + f_{25} + f_{28}$ $c_5 = a_1 + a_2 + a_4 + a_5 + a_7 + f_2 + f_3 + f_4 + f_6 + f_9 + f_{11} + f_{13} + f_{14} + f_{15} + f_{19} + f_{21} + f_{22} + f_{24} + f_{27}$

In this example, $f_7$, $f_{16}$ and $f_{25}$ contribute to all three output bits: $c_0, c_2$, and $c_4$. Furthermore, optimization can be performed using the CAD (Computer Aided Design) tools to minimize the number of gates and/or delay for each block.

As for the inversion in GF(16) block, each of its 4 output bits is not a quadratic function of the 4 input bits. If the 4-bit representation of $x^{-17} = (d_5 d_4 d_2 d_0)$ and $x^{17} = (c_5 c_4 c_2 c_0)$, then the inversion may be defined with the following table:

| Input($c_5 c_4 c_2 c_0$) | Output ($d_5 d_4 d_2 d_0$) | | | |
|---|---|---|---|---|
| 0001 | 0 | 0 | 0 | 1 |
| 0010 | 1 | 1 | 0 | 0 |
| 0011 | 0 | 1 | 0 | 0 |
| 0100 | 1 | 0 | 1 | 1 |
| 0101 | 1 | 1 | 0 | 0 |
| 0110 | 0 | 0 | 1 | 0 |
| 0111 | 0 | 1 | 1 | 0 |
| 1000 | 1 | 1 | 0 | 1 |
| 1001 | 1 | 1 | 1 | 1 |
| 1010 | 0 | 1 | 1 | 0 |
| 1011 | 1 | 0 | 0 | 1 |
| 1100 | 0 | 1 | 0 | 0 |
| 1101 | 1 | 0 | 0 | 0 |
| 1110 | 0 | 1 | 0 | 1 |
| 1111 | 1 | 1 | 0 | 1 |

Because it's a 4-bit-IN, 4-bit-OUT look-up table, computer-aided-design (CAD) tools may be used to design the circuit and optimize the circuit size or delay by specifying the input or output truth table.

For the $x^{16}$ times $x^{-17}$, one may need to first convert the 4-bit representation in GF(16) for $x^{-17}$ to its equivalent 8-bit representation in GF(256). This may be a linear operation as explained below. In the 4-bit representation of $x^{-17} = (d_5 d_4 d_2 d_0)$, the four basis elements for GF(16) are:

00000001 (or equivalently, 1, in its polynomial form)
00001100 (or equivalently, $x^3 + x^2$, in its polynomial form)
01010000 (or equivalently, $x^6 + x^4$, in its polynomial form)
11100000 (or equivalently, $x^7 + x^6 + x^5$, in its polynomial form)

The polynomial representation for $x^{-17}$ is:

$$d_5 x^7 + (d_5 + d_4) x^6 + d_5 x^5 + d_4 x^4 + d_2 x^3 + d_2 x^2 + d_0 x^0$$

The multiplication of $x^{-17}$ by $x^{16}$, with $x^{-16} = (b_7 b_6 b_5 b_4 b_3 b_2 b_1 b_0)$, may be represented as:

$$\left(\sum_{i=0}^{7} e_i x^i\right) = (d_5 x^7 + (d_5 + d_4) x^6 + d_5 x^5 + d_4 x^4 + d_2 x^3 + d_2 x^2 + d_0 x^0)$$

$$\left(\sum_{i=0}^{7} b_i x^i\right) \cdot \mathrm{mod}(x^8 + x^4 + x^3 + x^1 + 1)$$

The coefficients $e_i$, where i=0, 1, ... 7, are quadratic functions of $b_i$ and $d_i$. Therefore, $e_0 = d_0 b_0 + d_2 b_5 + d_2 b_6 + d_4 b_2 d_4 b_4 + d_4 b_6 + d_4 b_7 + d_5 b_1 + d_5 + b_2 + d_5 b_3 + d_5 b_5$ $e_1 = d_0 b_1 + d_2 b_5 + d_2 b_7 + d_4 b_2 + d_4 b_3 + d_4 b_4 + d_4 b_5 + d_4 b_6 + d_5 b_1 + d_5 b_4 + d_5 b_5 + d_5 b_6$ $e_2 = d_0 b_2 + d_2 b_0 + d_2 b_6 + d_4 b_3 + d_4 b_4 + d_4 b_5 + d_4 b_6 + d_4 b_7 + d_5 b_2 + d_5 b_5 + d_5 b_6 + d_5 b_7$ $e_3 = d_0 b_3 + d_2 b_0 + d_2 b_1 + d_2 b_5 + d_2 b_6 + d_2 b_7 + d_4 b_2 + d_4 b_5 + d_5 b_1 + d_5 b_2 + d_5 b_5 + d_5 + b_6 + d_5 b_7$ $e_4 = d_0 b_4 + d_2 b_1 + d_2 b_2 + d_2 b_5 + d_2 b_7 + d_4 b_0 + d_4 b_2 + d_4 b_3 + d_4 b_4 + d_4 b_7 + d_5 b_1 + d_5 b_5 + d_5 b_6 + d_5 b_7$ $e_5 = d_0 b_5 + d_2 b_2 + d_2 b_3 + d_2 b_6 + d_4 b_1 + d_4 b_3 + d_4 b_4 + d_4 b_5 + d_5 b_0 + d_5 b_2 + d_5 b_6 + d_5 b_7$ $e_6 = d_0 b_6 + d_2 b_3 + d_2 b_4 + d_2 b_7 + d_4 b_0 + d_4 b_2 + d_4 b_4 + d_4 b_5 + d_4 b_6 + d_5 b_0 + d_5 b_1 + d_5 b_3 + d_5 b_7$ $e_7 = d_0 b_7 + d_2 b_4 + d_2 b_5 + d_4 b_1 + d_4 b_3 + d_4 b_5 + d_4 b_6 + d_4 b_7 + d_5 b_0 + d_5 b_1 + d_5 b_2 + d_5 b_4$ For the circuit design, the computer-aided-design (CAD) tool may be used to optimize the design.

From the above discussion, the benefit of the invention may be achieved by breaking down the 8-bit-to-8-bit inverse function in GF(256) into several blocks, such as the blocks illustrated in FIG. 1. Using the linear property of the $x^{16}$ function, the quadratic property of the $x^{17}$ function, and the 4-bit-to-4-bit operation in the reduced field (GF(16)). For example, using the 0.18 µm process, the proposed implementation has s size of 494 ASIC gates in one embodiment, comparing with 713 ASIC gates with a table look-up implementation. In one embodiment, one ASIC gate is about 10 µm2 in area. Therefore, some embodiments consistent with the invention may provide size reduction of 30%.

The multiplicative inversion in GF(256) noted above may be generalized to the design for multiplicative inversion for any $GF(p^{2m})$, where p is a prime. For design purposes, raising to the $p^m$-th power in $GF(p^{2m})$ may be a linear operation on the (2m)-tuple representation of the element. Raising to the $(p^m+1)$-th power may also be implemented as a quadratic function. The field $GF(p^m)$ is a subfield of $GF(p^{2m})$ as m divides 2m. These properties can be used to break down and simplify the design in computing the multiplicative inverse for any nonzero element in $GF(p^{2m})$. We now describe the procedure in detail below.

For any element x in $GF(p^{2m})$, $x^{p+1}$ is an element in the sub-field $GF(p^m)$ since $(x^{(p^m+1)})^{(p^m-1)} = x^{p^{2m}-1} = 1$. The computation of multiplicative inverse in $GF(p^{2m})$ can be broken down to the following 4 steps:

compute $x^{p^m+1}$, which is a quadratic function,
compute the inverse for $x^{p^m+1}$ in $GF(p^m)$, $(x^{p^m+1})^{-1}$,
compute $x^{p^m}$, which is a linear operation in $GF(p^{2m})$, and
multiply $(x^{p^m+1})^{-1}$ by $x^{p^m}$, which is a quadratic function.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method or process consistent with the present invention as a particular sequence of steps. However, to the extent that the method or process does not rely on the particular order of steps set forth herein, the method or process should not be limited to the particular sequence of steps described.

What is claimed is:

1. A data encryption device configured to compute at least an inverse of numerical data element x in Galois field $GF(p^{2m})$, wherein p is a prime number and m is an integer, the device comprising:
    a first group of logic gates being configured to compute $x^{p^m+1}$;
    a second group of logic gates being configured to compute an inverse for $x^{p^m+1}$ in $GF(p^m)$, $(x^{p^m+1})^{-1}$;
    a third group of logic gates being configured to compute $x^{p^m}$; and
    a fourth group of logic gates being configured to multiply $(x^{p^m+1})^{-1}$ by $x^{p^m}$, to obtain the inverse of the numerical data element x, $x^{-1}$.

2. The device of claim 1, wherein each of the first, second, third, and fourth groups of logic gates includes of a combination of AND gates and XOR gates.

3. The device of claim 1, wherein the first group of logic gates includes of XOR gates and 2-input AND gates.

4. The device of claim 1, wherein the second group of logic gates comprises logic gates designed by a computer-aided-design tool.

5. The device of claim 1, wherein the third group of logic gates includes of XOR gates.

6. The device of claim 1, wherein the fourth group of logic gates includes of AND gates and XOR gates.

* * * * *

UNITED STATES PATENT AND TRADEMARK OFFICE
CERTIFICATE OF CORRECTION

| | | |
|---|---|---|
| PATENT NO. | : 7,668,895 B2 | Page 1 of 1 |
| APPLICATION NO. | : 11/000013 | |
| DATED | : February 23, 2010 | |
| INVENTOR(S) | : Lin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Seventh Day of December, 2010

David J. Kappos
*Director of the United States Patent and Trademark Office*